(12) United States Patent
Chu et al.

(10) Patent No.: US 7,821,497 B2
(45) Date of Patent: Oct. 26, 2010

(54) WIRELESS MOUSE CAPABLE OF STORING WIRELESS RECEIVER THEREIN

(76) Inventors: Wen-Chih Chu, No. 669, Rueiguang Road, Taipei (TW) 114; Hsiao-Lung Chiang, No. 669, Rueiguang Road, Taipei (TW) 114

( * ) Notice: Subject to any disclaimer, the term of this patent is extended or adjusted under 35 U.S.C. 154(b) by 1189 days.

(21) Appl. No.: 11/176,124

(22) Filed: Jul. 7, 2005

(65) Prior Publication Data

US 2006/0267943 A1 Nov. 30, 2006

(30) Foreign Application Priority Data

May 27, 2005 (TW) .............................. 94117419 A

(51) Int. Cl.
*G09G 5/08* (2006.01)
(52) U.S. Cl. ....................................................... 345/163
(58) Field of Classification Search ......... 345/163–167, 345/156, 157; 715/700–702; 463/37; 200/333
See application file for complete search history.

(56) References Cited

U.S. PATENT DOCUMENTS

| 7,119,791 | B2 * | 10/2006 | Iwasaki ....................... 345/163 |
| 7,136,046 | B2 * | 11/2006 | Su ............................... 345/163 |
| 2007/0171096 | A1 * | 7/2007 | Chiang et al. .................. 341/20 |

FOREIGN PATENT DOCUMENTS

| CN | 86210312 | 2/1988 |
| CN | 2537046 | 2/2003 |

* cited by examiner

*Primary Examiner*—Abbas I Abdulselam
(74) *Attorney, Agent, or Firm*—Workman Nydegger

(57) ABSTRACT

A wireless mouse includes a wireless receiver and a mouse main body. The mouse main body includes an upper cover, a base, a receiving part and a withdrawing part. The base includes a first sidewall and a second sidewall. The receiving part is defined at an end of the first sidewall. The withdrawing part is defined at an end of the second sidewall. The wireless receiver is stored within the mouse main body through the receiving part, and the wireless receiver having been stored within the mouse main body is partially detached from the mouse main body through the withdrawing part.

20 Claims, 6 Drawing Sheets

WIRELESS MOUSE CAPABLE OF STORING WIRELESS RECEIVER THEREIN

FIELD OF THE INVENTION

The present invention relates to a wireless mouse, and more particularly to a wireless mouse capable of storing a wireless receiver within a main body thereof.

BACKGROUND OF THE INVENTION

With increasing development of the computer industries, wireless transmission technologies are widely used for signal transmission. Currently, many wireless transmission specifications such as IrDA, Bluetooth or the like are employed.

In addition, many peripheral devices are applicable to the computer system. Examples of the peripheral devices include wireless mice, wireless earphones, wireless keyboards, and so on. Among these, the wireless mice are the most popular wireless peripheral devices of the computer system.

Although this wireless mouse is convenient because no connecting wire is required, this wireless mouse still has several drawbacks. For example, when the wireless mouse is operated, a corresponding wireless receiver is necessary. In a case that this wireless mouse is used in other places, the user should carry the corresponding wireless receiver at the same time. In other words, if the wireless mouse and the wireless receiver are separately stored, the probability of losing either the wireless mouse or the wireless signal receiver is increased. Under this circumstance, the wireless mouse fails to be normally operated.

In views of the above-described disadvantages resulted from the prior art, the applicant keeps on carving unflaggingly to develop a wireless mouse according to the present invention through wholehearted experience and research.

SUMMARY OF THE INVENTION

It is an object of the present invention to provide a wireless mouse capable of storing a wireless receiver within a main body thereof.

In accordance with an aspect of the present invention, there is provided a wireless mouse. The wireless mouse includes a wireless receiver and a mouse main body. The mouse main body includes an upper cover, a base, a receiving part and a withdrawing part. The base includes a first sidewall and a second sidewall. The receiving part is defined at an end of the first sidewall. The withdrawing part is defined at an end of the second sidewall. The wireless receiver is stored within the mouse main body through the receiving part, and the wireless receiver having been stored within the mouse main body is partially detached from the mouse main body through the withdrawing part.

Preferably, the wireless mouse of the present invention further comprises an advancing torsion spring arranged on the base, wherein the advancing torsion spring has a terminal fixed within the mouse main body and the other terminal for providing a pushing force thereon to push forwardly the wireless receiver.

In a preferred embodiment, the receiving part comprises a first perforation, a first sheltering plate and a first torsion spring. The first sheltering plate is pivotally coupled to the base for sheltering the first perforation. The first torsion spring is employed for providing an torsional force on the first sheltering plate to have the first sheltering plate shelter the first perforation if no external force is exerted on the first sheltering plate.

In a preferred embodiment, the withdrawing part comprises a second perforation, a second sheltering plate, a second torsion spring and a fastening portion. The second sheltering plate is pivotally coupled to the base for sheltering the second perforation. The second torsion spring is employed for providing an torsional force on the second sheltering plate to have the second sheltering plate shelter the second perforation if no external force is exerted on the second sheltering plate. The fastening portion has a hooking structure thereon.

In a preferred embodiment, the wireless receiver further comprises an elongated recess structure.

In a preferred embodiment, the wireless mouse further comprises a power switch disposed within the mouse main body, wherein the power switch includes a touching portion arranged between the receiving part and the withdrawing part.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
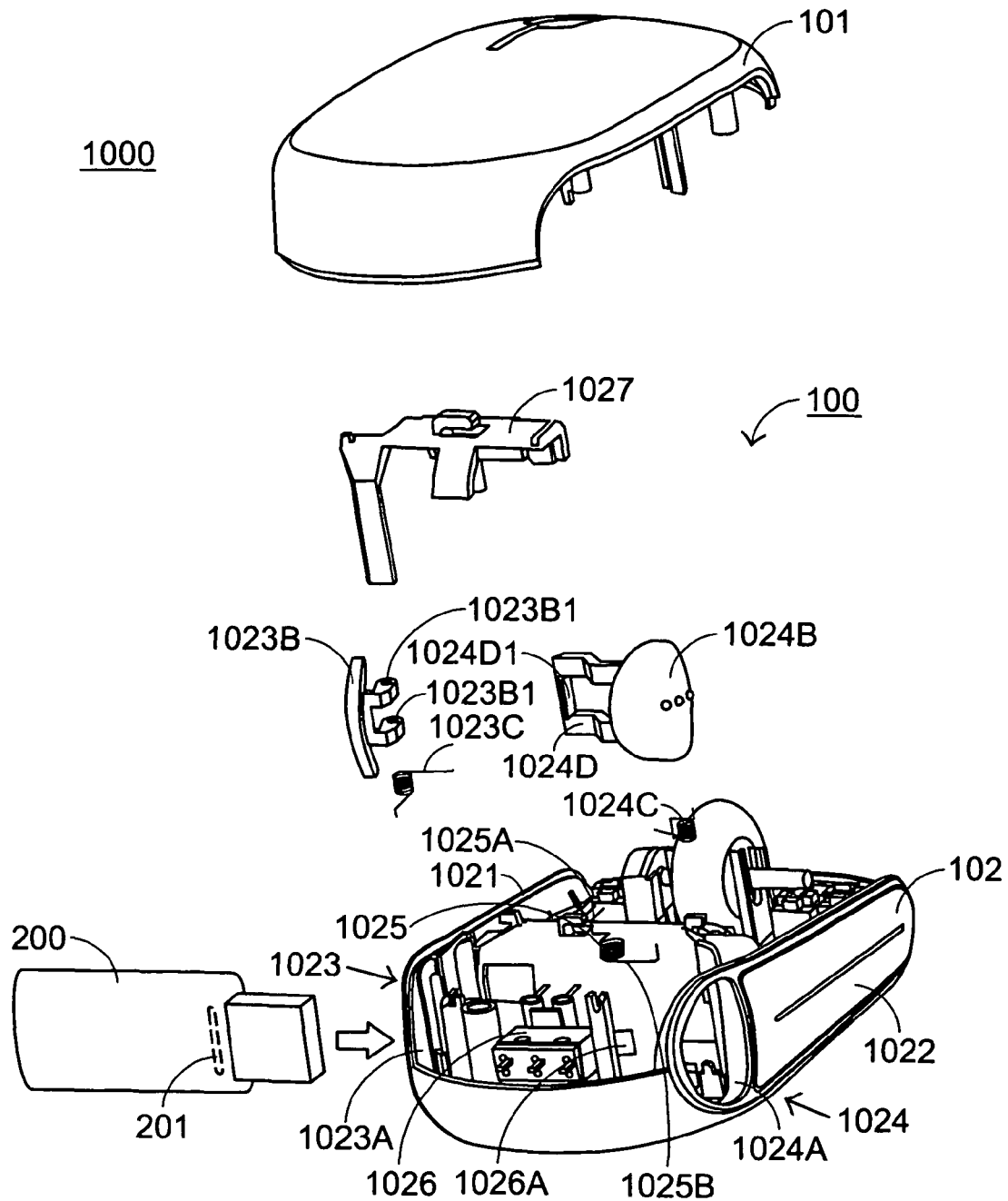
FIG. 1 is a schematic rear exploded view of a wireless mouse according to a preferred embodiment of the present invention.
Figure 2:
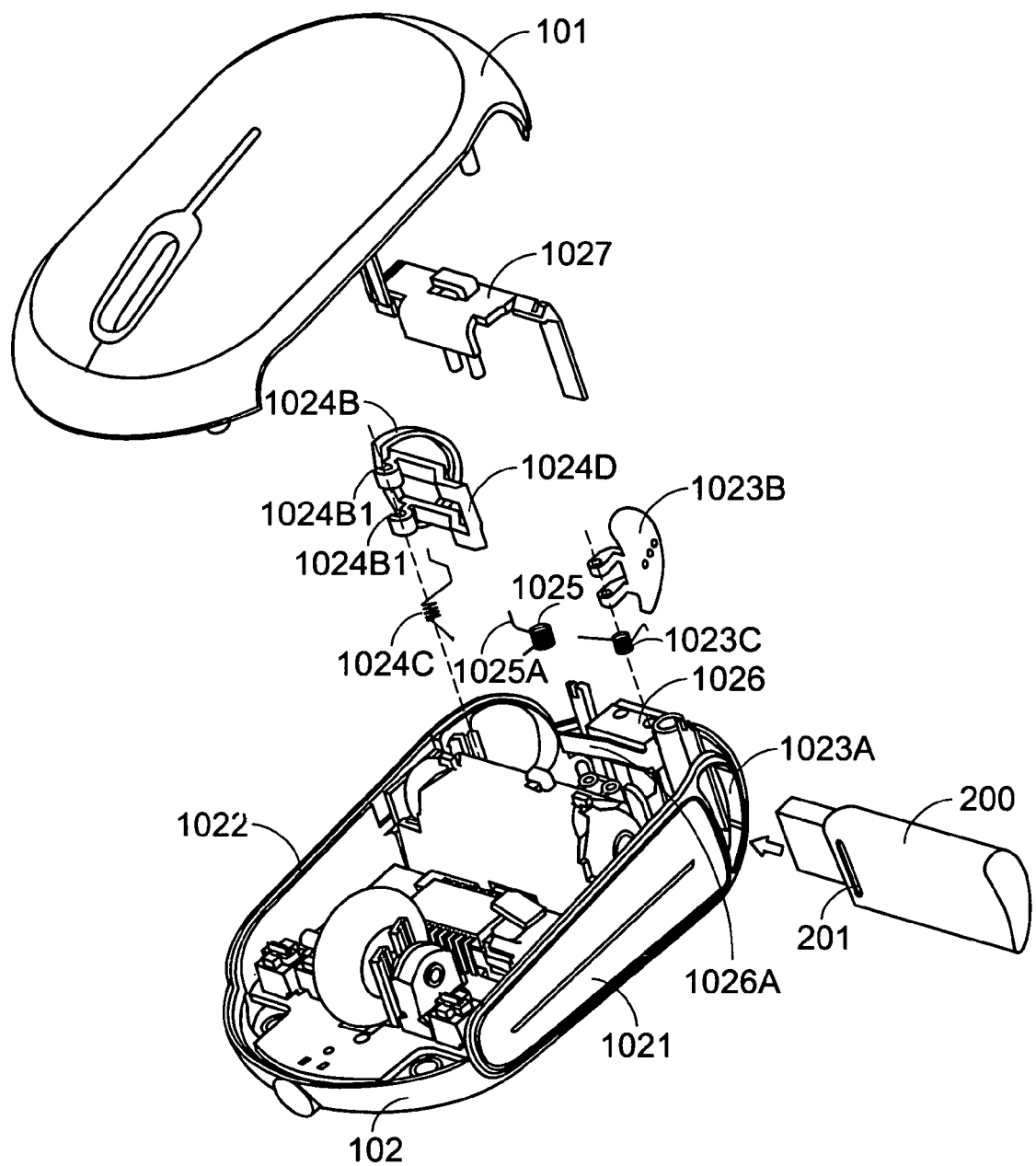
FIG. 2 is a schematic front exploded view of the wireless mouse of FIG. 1.

Please refer to FIGS. 1 and 2, which schematically illustrate rear and front exploded views of a wireless mouse according to a preferred embodiment of the present invention, respectively.

The wireless mouse 1000 of the present invention comprises a mouse main body 100 and a wireless receiver 200. If the wireless receiver 200 is electrically connected to a connection port of a host computer, the signals generated from the mouse main body 100 can be transmitted to the host computer via the wireless receiver 200.

A surface of the wireless receiver 200 has an elongated recess structure 201 therein.

The mouse main body 100 comprises an upper cover 101 and a base 102. The base 102 includes a first sidewall 1021 and a second sidewall 1022. A receiving part 1023 is defined at an end of the first sidewall 1021. Whereas, a withdrawing part 1024 is defined at an end of the second sidewall 1022.

The receiving part 1023 includes a first perforation 1023A, a first sheltering plate 1023B and a first torsion spring 1023C. The withdrawing part 1024 includes a second perforation 1024A, a second sheltering plate 1024B, a second torsion spring 1024C, a fastening portion 1024D protruding from the second sheltering plate 1024B and a hooking structure 1024D1 arranged on the fastening portion 1024D.

In addition, an advancing torsion spring 1025, a spatial restraining element 1027 and a power switch 1026 are further included within the base 102.

Figure 3:
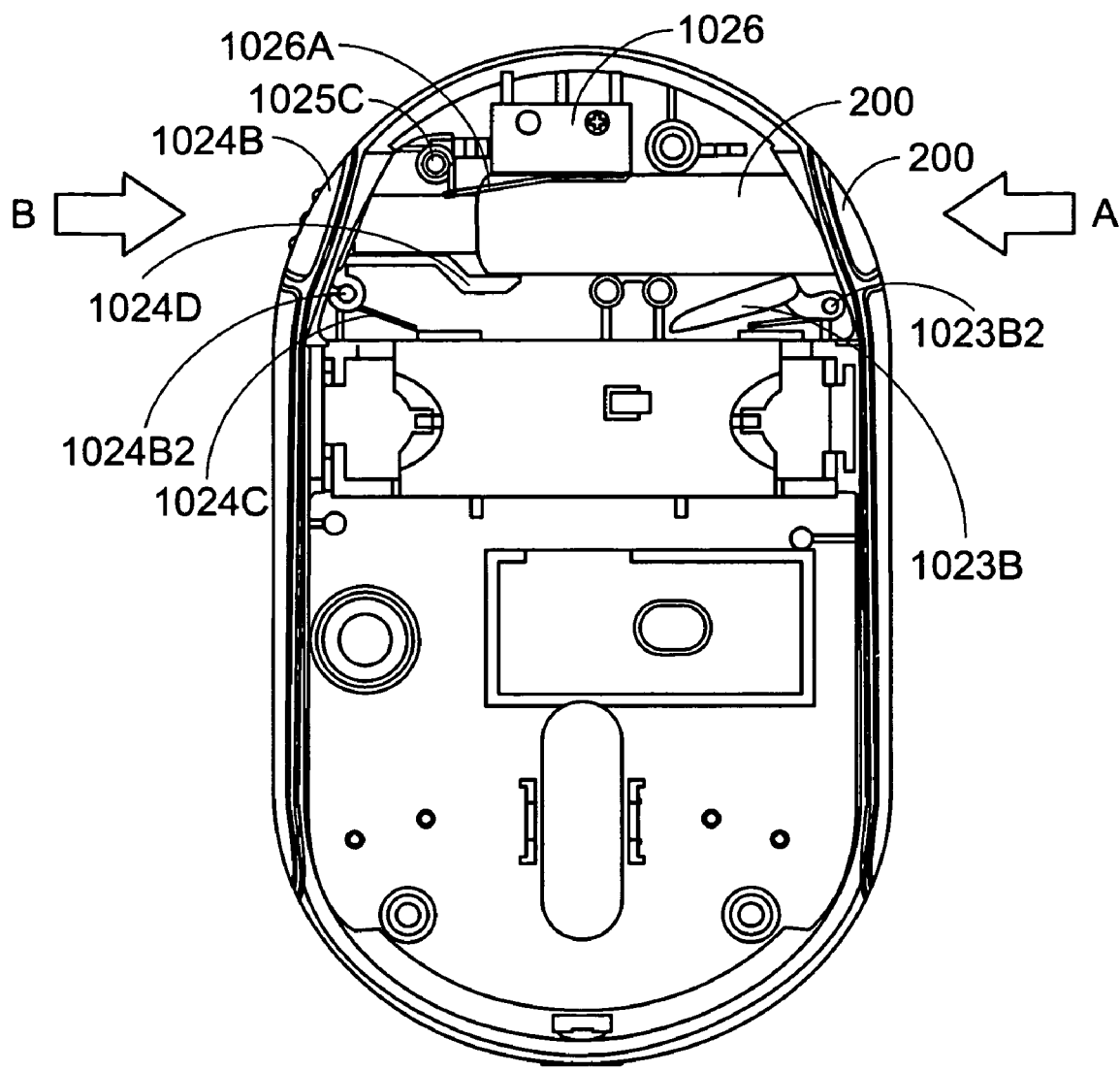
FIG. 3 is a schematic top assembled view of the wireless mouse according to the present invention.

Referring to FIG. 3, a schematic top assembled view of the wireless mouse according to the present invention is illustrated. The operating functions of the wireless mouse and the process for assembling the components thereof will be illustrated in more details as follows.

The first sheltering plate 1023B has two connecting holes 1023B1 sheathed around a first protrusion post 1023B2 (as shown in FIG. 3) within the base 102 such that the first sheltering plate 1023B is pivotal about the first protrusion post 1023B2. The first torsion spring 1023C is also sheathed around the first protrusion post 1023B2. A terminal of the first torsion spring 1023C is fixed on the base 102, and the other terminal thereof is sustained against a surface of the first sheltering plate 1023B so as to provide a torsional force to facilitate the uplift action of the first sheltering plate 1023B.

The second sheltering plate 1024B has two connecting holes 1024B1 sheathed around a second protrusion post 1024B2 (as shown in FIG. 3) within the base 102 such that the second sheltering plate 1024B is pivotal about the second protrusion post 1024B2. The second torsion spring 1024C is also sheathed around the second protrusion post 1024B2. A terminal of the second torsion spring 1024C is fixed on the base 102, and the other terminal thereof is sustained against a surface of the second sheltering plate 1024B so as to provide a torsional force to facilitate the uplift action of the second sheltering plate 1024B.

The advancing torsion spring 1025 is sheathed around a third protrusion post 1025C (as shown in FIG. 3). A terminal 1025B of the advancing torsion spring 1025 is fixed on the base 102, and the other terminal 1025A thereof is employed to provide a pushing force to push forwardly the wireless receiver 200.

The spatial restraining element 1027 (not shown in FIG. 3) is fixed on the wireless receiver 200 to avoid positional shift of the wireless receiver 200 during the wireless receiver 200 is moved within the mouse main body 100.

Figure 4:
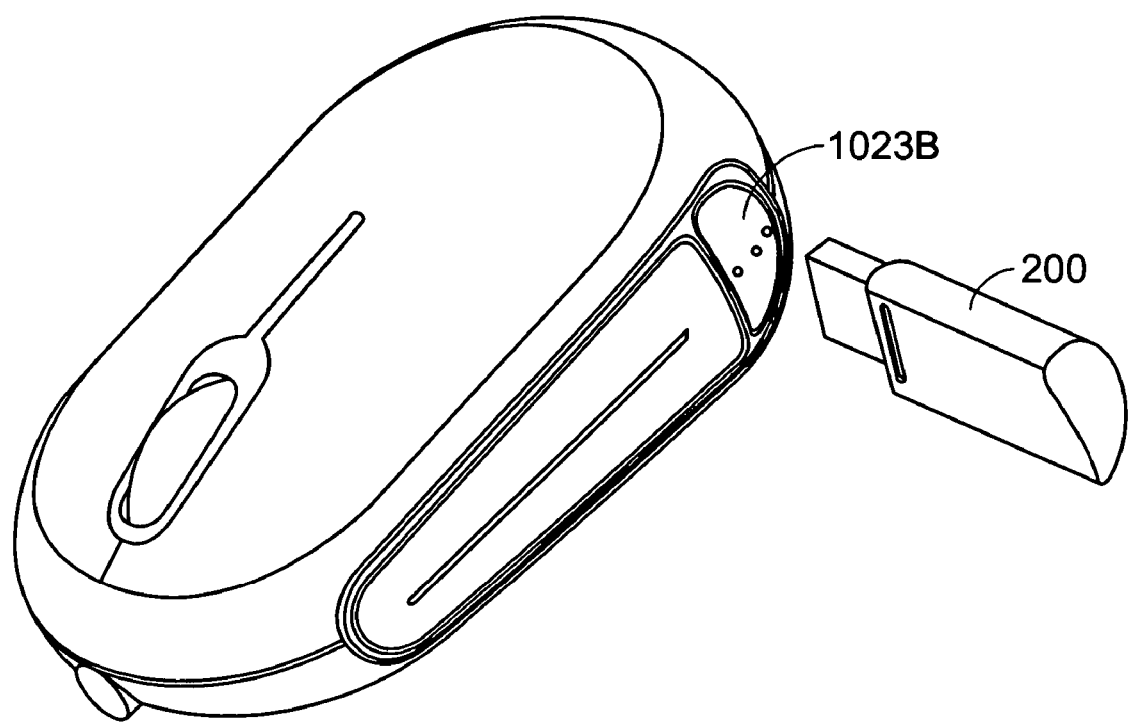
FIG. 4 is a schematic view illustrating that the wireless receiver has not been stored within the mouse main body.

Referring to FIG. 4, when the wireless receiver 200 has not been stored within the mouse main body 100, the first perforation 1023A is sheltered by the first sheltering plate 1023B due to torsional force resulted from the first torsion spring 1023C. Likewise, the second perforation 1024A is covered by the second sheltering plate 1024B due to torsional force resulted from the second torsion spring 1024C.

Figure 5:
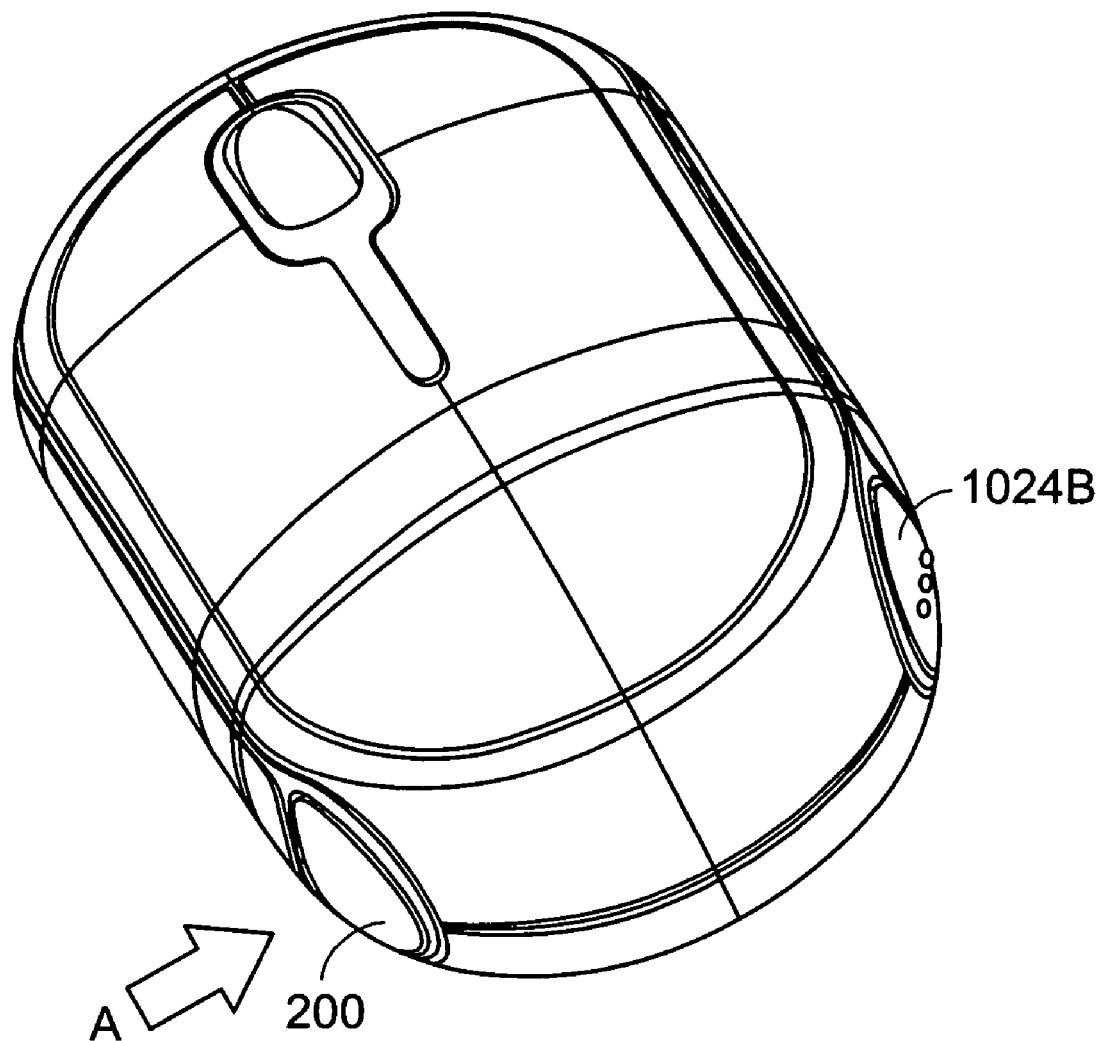
FIG. 5 is a schematic view illustrating that the wireless receiver has been stored within the mouse main body.

Please refer to FIG. 5. Once the wireless receiver 200 is pushed toward the receiving part 1023 in the arrow direction A, the wireless receiver 200 will be stored within the mouse main body 100.

Please refer to FIG. 3 again. During the wireless receiver 200 is pushed forward to touch the receiving part 1023, the first sheltering plate 1023B is rotated to detach from the first perforation 1023A such that the wireless receiver 200 will be stored within the mouse main body 100 through the first perforation 1023A. After the wireless receiver 200 is completely stored within the mouse main body 100, the elongated recess structure 201 of the wireless receiver 200 engages with the hooking structure 1024D1 on the fastening portion 1024D such that the wireless receiver 200 is fixed within the mouse main body 100. Under this circumstance, the spring arm 1025A of the advancing torsion spring 1025 is sustained against one end of the advancing torsion spring 1025 for providing an elastic force to the wireless receiver 200.

In addition, there is a power switch 1026 included within the mouse main body 100. In a case that the wireless receiver 200 is stored within the mouse main body 100, the wireless receiver 200 would touch a touching portion 1026A of the power switch 1026 such that the power switch 1026 is shut off. In other words, under this circumstance, the wireless mouse 1000 in not in use, thereby saving power consumption.

Figure 6:
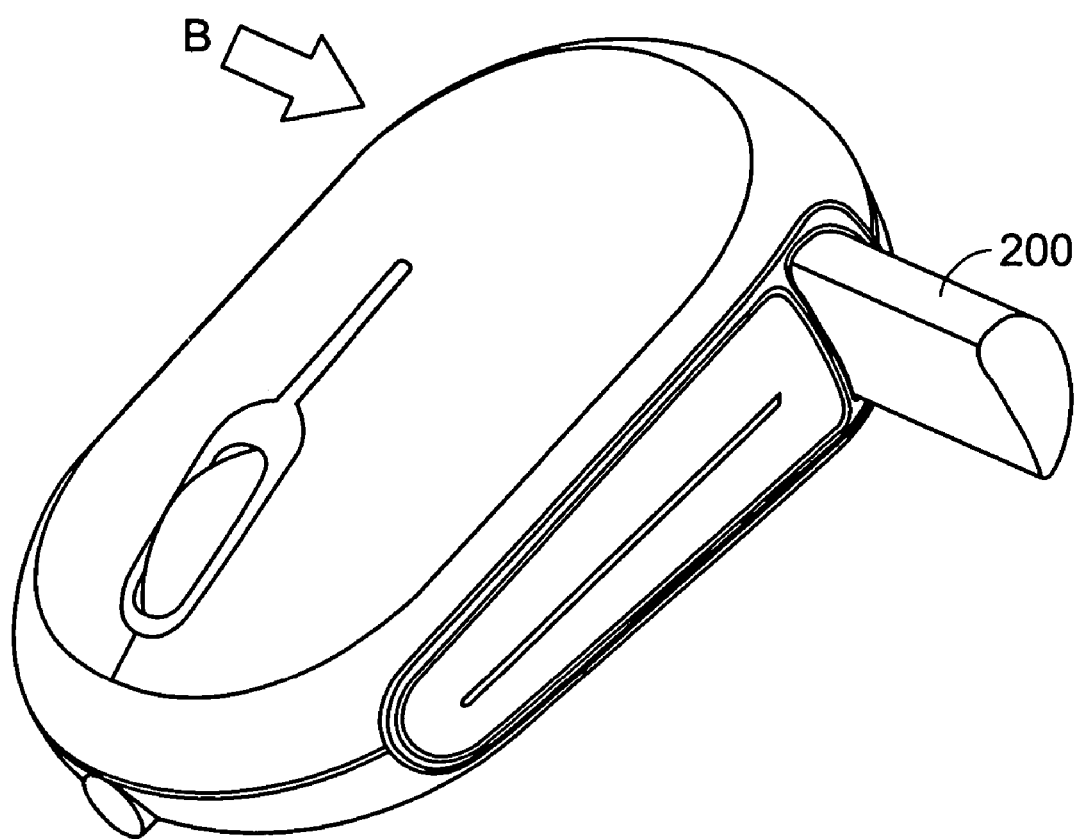
FIG. 6 is a schematic view illustrating that a portion of the wireless receiver is detached from the mouse main body.

On the other hand, if the user is intended to remove the wireless receiver 200 out of the mouse main body 100, an external force should be exerted on the second sheltering plate 1024B in the arrow direction B. Meanwhile, the second sheltering plate 1024B is rotated to have the hooking structure 1024D1 of the fastening portion 1024D disengage with the elongated recess structure 201 of the wireless receiver 200. Due to the elastic force resulted from the advancing torsion spring 1025, the wireless receiver 200 is rendered to glide outside of the mouse main body 100, as shown in FIG. 6. Under this circumstance, the wireless receiver 200 can be removed from the mouse main body 100.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wireless mouse comprising:
   a wireless receiver; and
   a mouse main body comprising an upper cover, a base, a receiving part and a withdrawing part, wherein said base includes a first sidewall and a second sidewall, said receiving part is defined at an end of said first sidewall, and said withdrawing part is defined at an end of said second sidewall, wherein said wireless receiver is stored within said mouse main body through said receiving part, and said wireless receiver having been stored within said mouse main body is partially detached from said mouse main body through said withdrawing part.

2. The wireless mouse according to claim 1 further comprising an advancing torsion spring arranged on said base, wherein said advancing torsion spring has a terminal fixed within said mouse main body and the other terminal for providing a pushing force thereon to push forwardly said wireless receiver.

3. A wireless mouse comprising:
   a wireless receiver; and
   a mouse main body comprising an upper cover, a base, a receiving part and a withdrawing part, wherein said base includes a first sidewall and a second sidewall, said receiving part is defined at an end of said first sidewall, and said withdrawing part is defined at an end of said second sidewall, wherein said wireless receiver is stored within said mouse main body through said receiving part, and said wireless receiver having been stored within said mouse main body is partially detached from said mouse main body through said withdrawing part;
   an advancing torsion spring arranged on said base, wherein said advancing torsion spring has a terminal fixed within said mouse main body and the other terminal for providing a pushing force thereon to push forwardly said wireless receiver;
   wherein said receiving part comprises: a first perforation; a first sheltering plate pivotally coupled to said base for sheltering said first perforation; and a first torsion spring for providing a torsional force on said first sheltering plate to have said first sheltering plate shelter said first perforation if no external force is exerted on said first sheltering plate; wherein said withdrawing part comprises: a second perforation; a second sheltering plate pivotally coupled to said base for sheltering said second perforation; a second torsion spring for providing a torsional force on said second sheltering plate to have said second sheltering plate shelter said second perforation if no external force is exerted on said second sheltering plate; and a fastening portion having a hooking structure thereon; wherein said wireless receiver further comprises an elongated recess structure.

4. The wireless mouse according to claim 3 further comprising a power switch disposed within said mouse main body, wherein said power switch includes a touching portion arranged between said receiving part and said withdrawing part.

5. A wireless mouse comprising:
a wireless receiver; and
a mouse body comprising
   first and second apertures penetrating an outer surface of the mouse body;
   a channel extending between the first and second apertures; and
   an urging member movably secured to the mouse body proximate the second aperture;
wherein the wireless receiver is selectively insertable through the first aperture into the channel and wherein the urging member is positioned to selectively engage the wireless receiver responsive to an external force applied through the second aperture to urge the wireless receiver out through the first aperture.

6. The wireless mouse of claim 5, further comprising a biasing member positioned to urge the urging member away from engagement with the wireless receiver.

7. The wireless mouse of claim 5, further comprising a cover pivotally secured proximate the first aperture and having a first position extending across the first aperture and a second position extending into the channel toward the second aperture when the wireless receiver is positioned within the channel.

8. The wireless mouse of claim 7, further comprising a biasing member positioned to urge the cover toward the first position.

9. The wireless mouse of claim 5, further comprising, a catch coupled to the urging member, the catch positioned to hinder removal of the wireless receiver from the channel when no external force is applied to the urging member.

10. The wireless mouse of claim 9, wherein the wireless receiver includes an aperture sized to receive the catch and engaging the catch when the wireless receiver is positioned within the channel.

11. The wireless mouse of claim 9, further comprising a biasing member engaging the wireless receiver and urging the wireless receiver toward the first aperture when the wireless receiver is positioned within the channel.

12. The wireless mouse of claim 5, further comprising a power switch projecting into a portion of the channel occupied by the wireless receiver when the wireless receiver is positioned within the channel.

13. A method for using a wireless mouse comprising:
inserting a wireless receiver into a first aperture penetrating an outer surface of the wireless mouse such that a first end of the wireless receiver is proximate a second aperture penetrating the outer surface of the wireless mouse and a second end of the wireless receiver is positioned proximate the first aperture; and
applying an external force to an urging member extending across the second aperture to urge the wireless receiver out of the first aperture.

14. The method of claim 13, wherein inserting the wireless receiver through the first aperture comprises deflecting a cover extending across the first aperture.

15. The method of claim 13, wherein inserting the wireless receiver through the first aperture further comprises moving the receiver into engagement with a catch coupled to the urging member, the catch positioned to hinder removal of the wireless receiver from the channel when no external force is applied to the urging member.

16. The method of claim 15, wherein applying the external force to the urging member further comprises moving the catch out of engagement with the receiver.

17. The method of claim 15, wherein inserting the wireless receiver through the first aperture further comprises urging the wireless receiver against a biasing member engaging the wireless receiver to urge the wireless receiver toward the first aperture.

18. The method of claim 13, wherein inserting the wireless receiver through the first aperture further comprises urging the wireless receiver against a power switch such that the wireless mouse is powered down.

19. A wireless mouse comprising:
a wireless receiver; and
a mouse body comprising
   first and second apertures penetrating an outer surface of the mouse body, the first aperture sized to receive the wireless receiver;
   a channel extending between the first and second apertures and sized to contain the wireless receiver; and
   means for transmitting an external force through the second aperture to urge the wireless receiver out through the first aperture.

20. The wireless mouse of claim 19, further comprising a means for biasing the wireless receiver outwardly through the first aperture and a means for selectively hindering removal of the wireless receiver from the channel.

* * * * *